(12) United States Patent
Vivanco et al.

(10) Patent No.: US 11,902,850 B2
(45) Date of Patent: Feb. 13, 2024

(54) SYSTEM AND METHODS FOR DETECTING UN-RESPONSIVE CELLS OVER LTE AND 5G NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Slawomir Mikolaj Stawiarski, Carpentersville, IL (US); David Ross Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 428 days.

(21) Appl. No.: 17/344,326

(22) Filed: Jun. 10, 2021

(65) Prior Publication Data

US 2022/0400423 A1 Dec. 15, 2022

(51) Int. Cl.
*H04W 36/00* (2009.01)
*H04W 36/30* (2009.01)
*H04W 36/08* (2009.01)

(52) U.S. Cl.
CPC ..... *H04W 36/305* (2018.08); *H04W 36/0079* (2018.08); *H04W 36/008375* (2023.05); *H04W 36/08* (2013.01)

(58) Field of Classification Search
CPC .......... H04W 36/305; H04W 36/0079; H04W 36/008375; H04W 36/08; H04W 24/04
USPC ........................................... 370/331; 455/312
See application file for complete search history.

(56) References Cited

U.S. PATENT DOCUMENTS

2013/0217382 A1* 8/2013 Kudo .................... H04W 24/04
455/423

* cited by examiner

*Primary Examiner* — Marcos Batista
(74) *Attorney, Agent, or Firm* — Guntin & Gust, PLC; Dana B. LeMoine

(57) ABSTRACT

Aspects of the subject disclosure may include, for example, collecting network data for a plurality of cells of a cellular communication network, identifying a particular cell of the plurality of cells is in an un-responsive state, wherein the identifying is based on the network data, selecting a plurality of user equipment (UE) devices as UE test devices, forcing cell reselection attempts, handover attempts, or both, by the UE test devices to communicate with the particular cell, confirming the particular cell is in the un-responsive state based on failure of the cell reselection attempts or failure of the handover attempts, and communicating a restart signal from the processing system to cause the particular cell to restart to a responsive state. Other embodiments are disclosed.

20 Claims, 9 Drawing Sheets

```
sib5
  interFreqCarrierFreqList                    ⟵232
    interFreqCarrierFreqList value 1                    ⟵234
      dl-CarrierFreq          : ███
      q-RxLevMin              : -61    (= -122 dBm)
      p-Max : 23
      t-ReselectionEUTRA      : 2
      threshX-High   : 0    (= 0 dB)
      threshX-Low    : 31   (= 62 dB)
      allowedMeasBandwidth    : mbw50
      presenceAntennaPort1    : true          ⟵236
      cellReselectionPriority : 2
      neighCellConfig
        Bin : 4 (2 bits)               ⟵232
    interFreqCarrierFreqList value 2                    ⟵234
      dl-CarrierFreq          : ███
      q-RxLevMin              : -61    (= -122 dBm)
      p-Max : 23
      t-ReselectionEUTRA      : 2
      threshX-High   : 0    (= 0 dB)
      threshX-Low    : 0    (= 0 dB)
      allowedMeasBandwidth    : mbw100
      presenceAntennaPort1    : true          ⟵236
      cellReselectionPriority : 3
      neighCellConfig
        Bin : 4 (2 bits)
      q-OffsetFreq  : dB3            ⟵232
    interFreqCarrierFreqList value 3                    ⟵234
      dl-CarrierFreq          : ███
      q-RxLevMin              : -61    (= -122 dBm)
      t-ReselectionEUTRA      : 2
      threshX-High   : 0    (= 0 dB)
      threshX-Low    : 0    (= 0 dB)
      allowedMeasBandwidth    : mbw50
      presenceAntennaPort1    : true          ⟵236
      cellReselectionPriority : 4
      neighCellConfig
        Bin : 4 (2 bits)
      q-OffsetFreq  : dB-14
  lateNonCriticalExtension
    SystemInformationBlockType5-v8h0-IEs
      interFreqCarrierFreqList-v8h0
        interFreqCarrierFreqList-v8h0 value 1
          multiBandInfoList
            multiBandInfoList value : 12
        interFreqCarrierFreqList-v8h0 value 2
        interFreqCarrierFreqList-v8h0 value 3
```

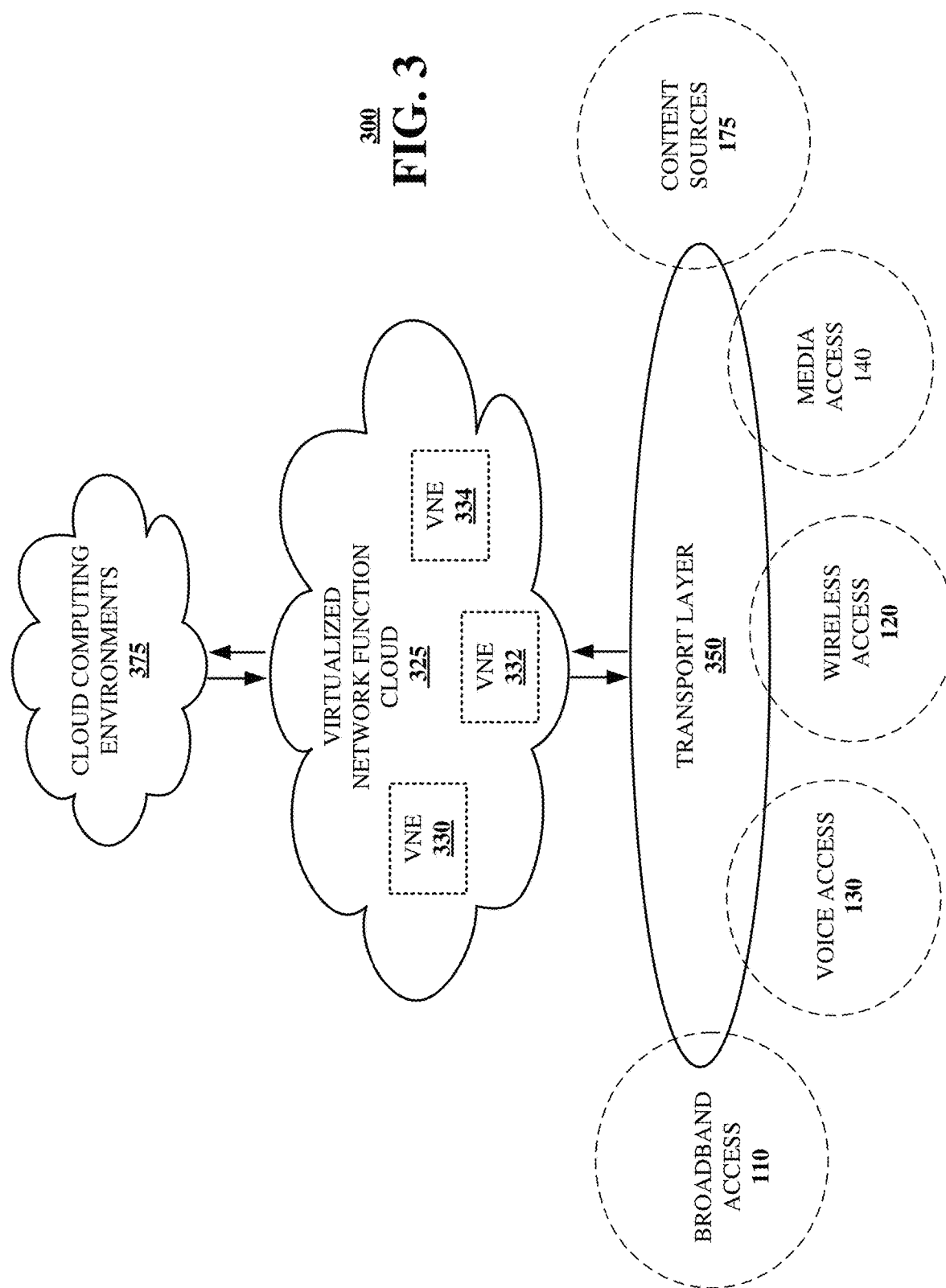

SYSTEM AND METHODS FOR DETECTING UN-RESPONSIVE CELLS OVER LTE AND 5G NETWORKS

FIELD OF THE DISCLOSURE

The subject disclosure relates to detecting and correcting un-responsive cells in a radio communication network.

BACKGROUND

Radio communication systems include a plurality of cells providing communication services to user equipment in regions serviced by the cells. At times, a cell, including a base station and other equipment, can become un-responsive to radio communication traffic.

BRIEF DESCRIPTION OF THE DRAWINGS

Reference will now be made to the accompanying drawings, which are not necessarily drawn to scale, and wherein:

FIG. 2B depicts an illustrative embodiment of a message for communication in the communication network 200 of FIG. 2A in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for detecting and correcting unresponsive cells or base stations or access points in a radio communication network such as a cellular communication network. The proposed solution quickly and efficiently identifies cells that are in an unresponsive stage. Prompt identification of this issue can improve system response to resolve the issue with minimum service disruption. Other embodiments are described in the subject disclosure.

One or more aspects of the subject disclosure include collecting, by a processing system including a processor, current performance data for a particular cell of a radio communication system, comparing, by the processing system, the current performance data with normal performance data for one or more cells of the radio communication system, forming a comparison and concluding, by the processing system, that the particular cell is a suspected un-responsive cell, wherein the concluding is based on the comparison. Other aspects of the subject disclosure include confirming, by the processing system, that the suspected un-responsive cell is un-responsive, wherein the confirming is based on testing responsiveness of the suspected un-responsive cell to test communications and adjusting equipment at the suspected un-responsive cell.

One or more aspects of the subject disclosure include detecting a particular cell of radio communication system as being un-responsive, wherein the detecting is based on a received signature from the particular cell, confirming the particular cell as being un-responsive based on network data produced responsive to stimulus signals provided to the network, and responsive to a confirmation that the particular cell is un-responsive, communicating a signal from the radio communication control device to the particular cell, the particular cell responsive to the signal to restart the particular cell.

One or more aspects of the subject disclosure include collecting network data for a plurality of cells of a cellular communication network, identifying a particular cell of the plurality of cells is in an un-responsive state, wherein the identifying is based on the network data, selecting a plurality of user equipment (UE) devices as UE test devices, forcing cell reselection attempts, handover attempts, or both, by the UE test devices to communicate with the particular cell, confirming the particular cell is in the un-responsive state based on failure of the cell reselection attempts or failure of the handover attempts, and communicating a restart signal from the processing system to cause the particular cell to restart to a responsive state.

Figure 1:
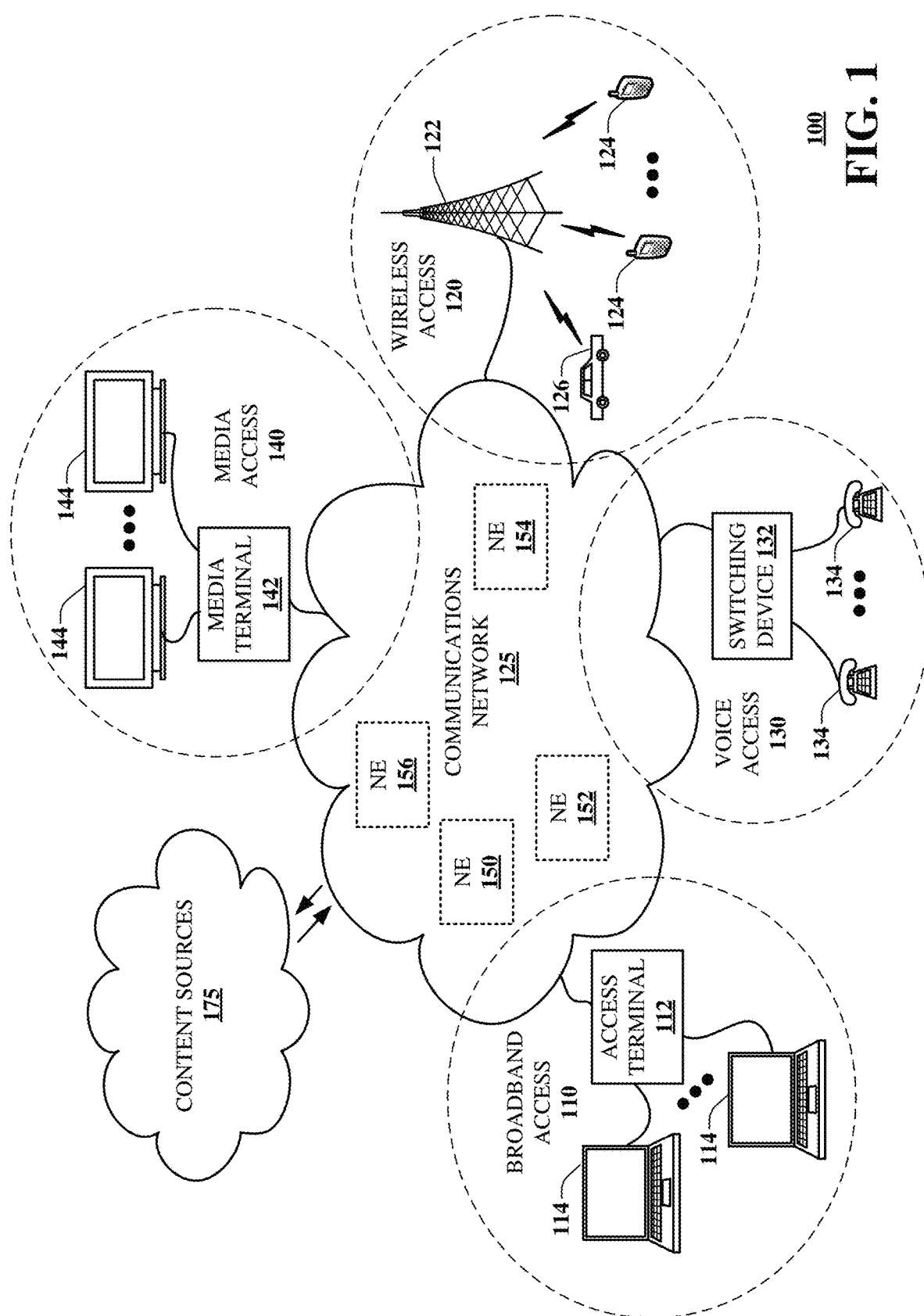
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part detecting and identifying a cell in a radio communication system that is in an un-responsive state, confirming the unresponsive state using user equipment devices as test devices, and correcting the un-unresponsive state. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications networks.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
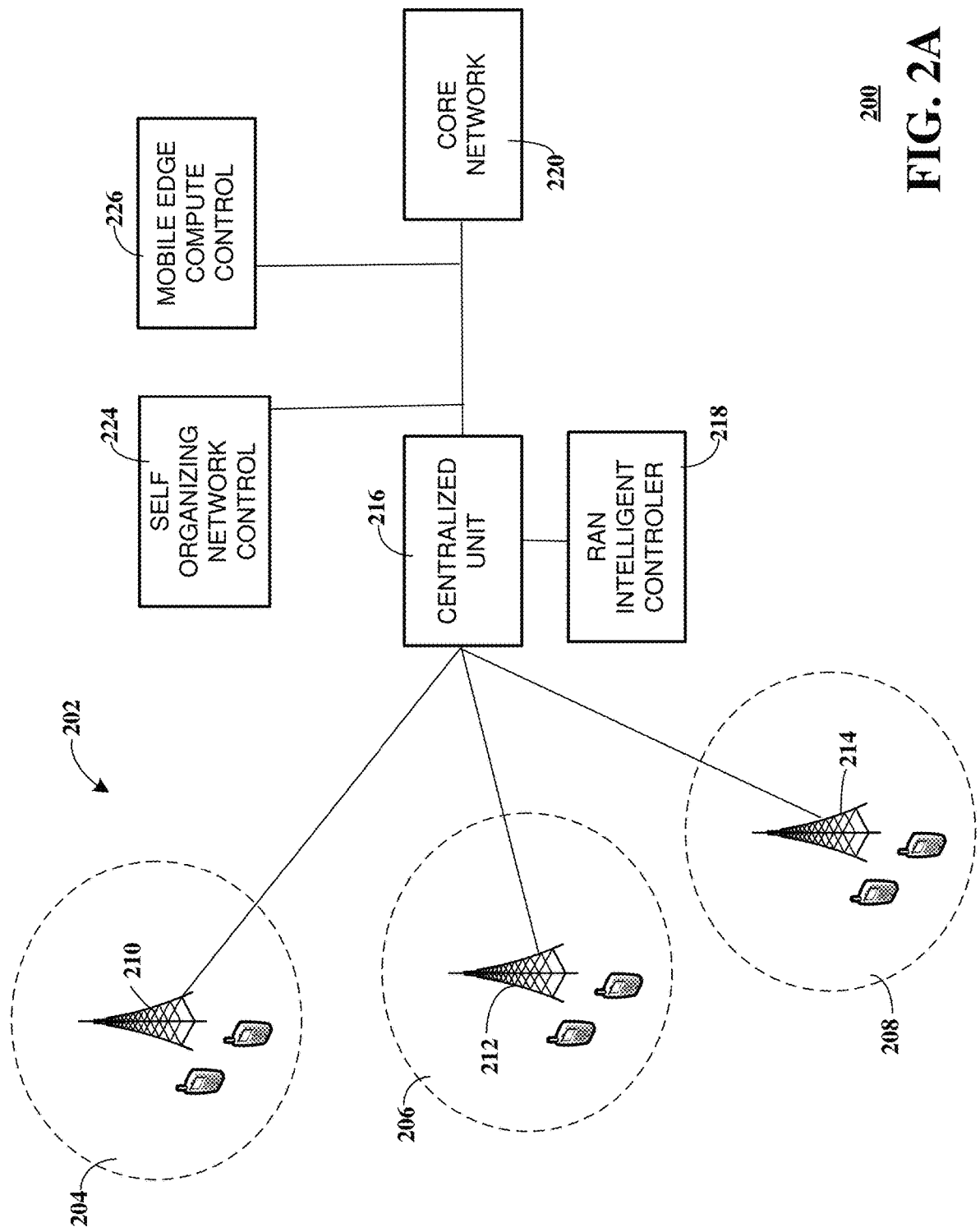
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a communications network 200 including a communication network 202 functioning within the communication network 125 of FIG. 1 in accordance with various aspects described herein. The communication network 202 is an exemplary embodiment of a radio communication network for radio communication among fixed parts such as base stations or access points and portable parts such as mobile devices.

Embodiments may have particular application in a radio communication system such as a cellular communication system. Such a system generally includes a plurality of cells in which each respective cell provides telecommunication service to a respective geographic area. In FIG. 1, wireless access 120 is an example of providing radio communication to a plurality of mobile devices 124 and vehicle 126 via base station or access point 122. The base station or wireless access 120 provides telecommunication service to compatible equipment in the geographic area served by the base station or wireless access 120. A cellular communication system may include a plurality of contiguous cells, each cell including a base station or access point 122 serving an assigned area. The base station or access point 122 provides radio communication services to mobile phones other devices in a cell. Such a cellular communication system may be referred to as a mobile communication system. As a mobile phone or other device moves from a first cell to an adjacent cell, radio communication with a particular base station or access point 122 is handed off to a subsequent base station or access point serving the adjacent cell in a process known as handoff or handover.

The radio communication system may be a radio access network (RAN) which provides radio communication services to user equipment (UE) within a geographic area. The RAN may include a plurality of access points or base stations. The RAN may be in communication with a core network (CN) for connection to other communication services and for managing tasks such as UE registration and handoff. The access points or base stations may be referred to as a Node B or evolved Node B or eNodeB or other names. Each RAN operates according to a radio access technology. Examples of such radio access technologies include fifth generation cellular (5G), fourth generation cellular (4G), Long-term Evolution (LTE) or third generation cellular (3G), Universal Mobile Telecommunication System (UMTS), Evolved Universal Mobile Telecommunications System Terrestrial Radio Access Network (E-UTRAN) and others as well. The UE operates according to complementary radio access technology. The UE may be referred to as a mobile station (MS), portable part (PP) or new radio (NR), for example, Un-responsive or non-responsive cells are defined as radio devices in a radio access network such as LTE or NR that are not processing any data or control traffic although the cell is broadcasting system information block (SIB) messages and emitting signals. Un-responsive cells are active cells, and other components of the network expect these cells to process traffic including data traffic, non-data traffic such as voice and control traffic, but they fail to do that. Such cells may be termed sleeping cells since they may provide indications of functionality, such as broadcasting channels to user equipment.

A cell can go into an un-responsive state due to a variety of reasons. Examples include a failure in the cell's controlling software or in the data storage memory on the central processing unit (CPU) in the cell. Further, an LTE or 5G cell site may have several cells. In such a case, it is possible that only one cell is inactive, and the other cells are alive and responsive to communication from other network elements.

For the UE and other components of the network, an un-responsive cell looks as active, but the cell fails to respond to requests from the UE or other components of the network. This un-responsive condition of a cell may be temporary or permanent. UEs in the vicinity will be able to scan the signals transmitted by the un-responsive cell and the UEs may attempt to attach to such a cell, hand over communication to such a cell, or reselect to such a cell. However, attachment, handover or reselection will fail since an un-responsive cell cannot process a UE data request. It is possible that UE devices in idle mode can select or reselect to an unresponsive cell however, if they try to establish an RRC connection, such attempt will not be successful.

Communications generated by and received from an unresponsive cell may be anomalous or even normal appearing. An un-responsive cell may report ZERO/NULL values on some or all of its key performance indicators (KPIs). However, the cell will not report alarms to notify that it entered a faulty state. In many cases, engineers monitoring network operation have only an option of manually resetting the cell to resolve this issue. Such a manual reset can be disruptive to overall network communications, it can cause dropped calls to subscribers and can cause a service outage for a certain time to a certain area. All of these problems are desirably avoided when providing reliable, consistent telecommunication service to subscribers in the network.

Detecting un-responsive cells can be very difficult. As noted, the cell may not report its own un-responsive state and the cell may merely appear to be sleeping. Currently, published standards for such radio access networks, such as standards published by the $3^{rd}$ Generation Partnership Project (3GPP) do not provide standards and procedures for detecting un-responsive cells. Detecting an un-responsive cell may require and engineer or technician to review data about current performance of a cell and historical performance of a cell. Confirming that the cell is un-responsive may require sending a maintenance crew and truck to the site location of the cell to test the cell's condition and take corrective measures. However, such manual detection and intervention is costly and can take substantial time. If the cell is un-responsive, the network is performing at less-than-optimal levels and customer service may be severely impacted.

Referring again to FIG. 2A, it depicts an illustrative embodiment of communication network 200 in accordance with various aspects described herein. In accordance with some embodiments, aspects of the communication network 200 may be used to automatically detect and confirm that a cell has become un-responsive. Such automatic detection may greatly reduce the cost and time required to resolve an un-responsive cell.

The communication network 200 in the exemplary embodiment of FIG. 2A incudes three cells including a first cell 204, a second cell 206 and a third cell 208. The first cell 204 is served by a first base station or distributed unit (DU) 210. The second cell 206 is served by a base station or second distributed unit (DU) 212. The third cell 208 is served by a third base station or distributed unit (DU) 214. The radio communication network 200 further includes a centralized unit (CU) 216 and a radio access network (RAN) intelligent controller (RIC) 218. The CU 216 is in data communication with the core network 220. The three cells including the first cell 204, the second cell 206 and the third cell 208 together form a cluster 222.

In the exemplary embodiment of FIG. 2, the cluster 222 includes three cells. Particular embodiments may include any suitable number of cells in cluster 222, depending on network requirements, traffic levels and other factors. In typical embodiment, the cluster 222 may include dozens or hundreds of cells. Also, the number of cells in the cluster 222 may vary over time as network usage and build-out change and develop. For example, if cell 204 is divided into multiple smaller cells to manage increasing traffic levels, the smaller cells may be added to the cluster 222, increasing the number of cells in the cluster 222.

The radio communication network 200 implements a RAN using radio access technology. In the illustrated example, Third Generation Partnership Project (3GPP) NR 5G cellular network technology is implemented in the radio communication network. However, any suitable radio access technology now known or later developed may be selected. As noted, the cluster 222 may include any suitable number of cells and it is anticipated that the cluster 222 will include a large number of cells, such as 100 cells served by 100 respective DUs.

The DUs 210, 212, 214 are logical nodes that perform a subset of eNodeB functions. Each respective DU provides mobile radio communication service to user equipment (UE) devices located in the respective cell served by the respective DU. In the example of FIG. 2A, each respective DU 210, 212, 214 is one DU of a cluster 222 of DUs serving respective geographically contiguous areas defined by the respective cells including first cell 204, second cell 206, and third cell 208 and operating substantially synchronously so that uplink transmissions are substantially synchronous among the DUs 210, 212, 214 of the cluster 222 and downlink transmissions are substantially synchronous among the DUs 210, 212, 214 of the cluster 222 to limit inter-cell interference.

Each DU of the communication network 202, including first DU 210, second DU 212 and third DU 214, is in communication with the CU 216. In some embodiments, each respective DU is a remote radio head (RRH) or remote radio unit (RRU), providing radio frequency (RF) communication with UE in each respective cell. Each DU, including first DU 210, second DU 212 and third DU 214, may communicate with the CU 216 using fiber optic cable or other means of data communication.

The CU 216 provides control of the respective DUs in the radio communication network 200. The CU 216 is a logical node that performs a subset of eNodeB functions. Such functions may include transfer of user data, mobility control, radio access network sharing, positioning, session management, for example. The CU 216 provides baseband central control. The CU 216 generally controls the respective DUs. The split of functionality between the CU 216 and DUs such as DU 210, DU 212, and DU 214, is established by the network operator of the communication network 200.

The CU 216 operates in conjunction with the RIC 218. The RIC 218 is a network element that controls certain aspects of the communication network 200. The RIC 218 provides access to some functions of the communication network 200. The RIC 218 may control operation of the CU 216 and respective DUs in the communication network 200.

In the illustrated embodiment, the communication network 200 includes a self-organizing network control module 224 and a mobile edge compute control module 226. The self-organizing network control module 224 may control implementation of a self-organizing network in the communication network 200. A self-organizing network (SON) may include automation technology to make the planning, configuration, management, optimization and healing of mobile radio access networks simpler and faster to achieve. In a self-organizing network, newly added base stations may be self-configured. Currently operating base stations will self-optimize. The self-organizing operation may be coordinated or controlled by the self-organizing network control module 224. The self-organizing network control module 224 may be in communication with other elements of the communication network 200. The self-organizing network control module 224 collects network information and performs suitable analysis. Mobile edge computing, or multi-access edge computer (MEC) enables cloud computing capabilities at the edge of a cellular network such as the network formed by the cluster 222. By running applications and performing related processing tasks closer to the cellular customer, network congestion may be reduced, and applications may perform better. MEC technology may be implemented at the cellular base stations or other edge nodes and may enable flexible and rapid deployment of new applications and services for customers.

In the communication network 200, it may occur that one or more of the base stations or eNodeB devices or DUs 210, 212, 214 becomes unresponsive or nonresponsive. Such devices may be generally referred to herein a cell and that term is intended to cover any and all equipment of a radio network that provides radio communication services to and connects with user equipment or UE in an area served by the cells. Nonresponsive cells are not able to process data, voice traffic or control traffic. However, nonresponsive cells are visible to UE devices in the network. Thus, the UE can connect to a nonresponsive cell but cannot use the nonresponsive cell. The cell may enter a nonresponsive state if there is a software problem with the base station so that the base station stops processing signaling in a proper way. This may occur because the memory of the base station is overloaded or there is a deadlock in the processing of dataflow of the base station. Any other situation may cause the base station to become locked and nonresponsive. The UE can find a control channel and connect to the base station but can take no further action with the base station. The serving site has, in effect, captured the UE. If the serving site was not active and communicating, the UE would select another site.

The existence of nonresponsive cells is an old problem. The problem has existed since the advent of GSM in the 1990s. In the past, a signature detection must be created, such as based on key performance indicator (KPI) metrics, to measure traffic at a suspected nonresponsive base station. If the cell is responsive, an observer will see successful connections by UE devices and traffic will be detected between the cell and the UE devices. When the cell becomes non-responsive, there will be no traffic on the cell even though the cell is considered active. This may manifest itself as a step function in traffic or other abnormality at the cell as indicated by KPI information for the cell. The cell or equipment of the cell may be configured to generate one or more alarms in the case of an abnormal situation but if the cell becomes nonresponsive, the alarms may not be generated.

To detect and resolve a nonresponsive cell, a circuit, a device or a module including software code, or a processing system including a processor or a machine-readable medium comprising executable instructions for execution by a processor, may be located within the network to detect and confirm a nonresponsive cell. The device or process may generally be termed an algorithm and includes a series of operations to be performed. The operations may be performed by software, hardware, or any suitable combination of these. In embodiments, the operations are performed automatically, without required human intervention, to detect and resolve an un-responsive cell. Such an automatic algorithm replaces the need for intervention by engineers or technicians to identify and resolve a non-responsive or sleeping cell.

The algorithm may be located at or be performed at any suitable location. In examples, the algorithm may be performed at a node of the core network 220, at the self-organizing network control module 224, at the mobile edge compute control 226 or at the RAN intelligent controller 218. In some applications, the algorithm may be located in the cloud, meaning that processing and storage facilities will be distributed across a plurality of devices which are in communication across a network and without regard to specific location of any particular aspect of the algorithm.

In some embodiments, the algorithm will operate to perform two functions. In a first function, the algorithm detects signatures that indicate a cell is in a nonresponsive state. This can be done, for example, by comparing KPIs for a cell with KPIs for neighboring cells and/or against historical data. Based on the comparison, the algorithm can determine if the cell in question has shown abnormal behavior.

In a first example, neighboring cells report heavy data-volume and mobility while a particular cell is reporting very low and invariant data-volume and little or no mobility. Mobility refers to the activity a cell records when a UE attaches to the cell and subsequently detaches from the cell, or when a link between the cell and the UE is handed over to another cell as the UE moves through the region. The reported KPIs for the particular cell may indicate that the cell is in an un-responsive state.

Comparing KPIs for the particular cell with KPIs or other information for neighboring cells may indicate that the performance of the particular cell is anomalous, indicating an un-responsive cell, if the KPIs for the particular cell are not in line with the KPIs for the neighboring cells. On the other hand, the particular cell and one or more neighboring cells having KPIs or other signatures that generally match may indicate some other problem in the network. The particular cell's performance is not anomalous but instead tracks the performance of the neighboring cells.

One or more particular KPIs may be selected as indicative of anomalous performance by the particular cell. For each KPI, a threshold value may be set, and the performance of the particular cell as measured by each KPI may be compared with the threshold. Performance data may be collected for a set period of time, such as one hour or one day for comparison with the threshold. If the performance data for the particular cell exceeds the threshold, or fails to exceed the threshold, then the particular cell may be considered un-responsive. If performance data for multiple KPIs are available, the comparison may be done according to any suitable averaging or other statistical analysis to reliably conclude the cell is un-responsive.

Examples of KPI information that may be used include control plane KPIs and user plane KPIs. Examples include a number of attempts to establish a connection between the UE and the cell and handovers from the cell to or from another adjacent cell. For example, radio resource control (RRC) protocol may be used on the air interface between the UE and the cell. The RRC protocol manages connection establishment and release, mobility, and other operations. The RRC protocol may maintain timers and counters to track progress of connections among devices and information about the times and counters may be reported to other devices. Failed attempts to handover to the cell may be counted and reported as a KPI. During operation, each cell maintains a counter of events such as connections and handover attempts and successful handovers. The counter value, or other information, may be used to identify anomalous behavior and a non-responsive cell. For example, a threshold of 0 successful connection attempts over a particular time period may be used to identify a non-responsive cell.

In a second example, historical KPI data of a particular cell may be retrieved and compared against current KPI data for the cell itself. If the particular cell has this signature, it may be determined to be in an un-responsive stage. Historical KPI data may be reported by each cell in the network and stored at a suitable storage location, such as the RAN intelligent controller 218. The network device, or combination of devices, that is performing the algorithm to identify an un-responsive cell, may obtain the historical data from the storage location for analysis according to the algorithm. In some embodiments, the current KPI data for a particular cell may be compared with the historical KPI data for the particular cell to determine if the particular cell is currently an un-responsive cell in the communication network 200. Any suitable KPI data may be used, such as successful number of connections to the particular cell or successful handovers to or from the particular cell over a particular time period. The current data and the historical data used for the analysis may be selected or adjusted for time, including a time duration or time of day. For example, a number of successful handovers for a time period such as from 9 AM to noon on the current day may be compared with the number of successful handovers for a matching time period from a previous day or week. Such consistent comparison helps to ensure a reliable conclusion about the status of the particular cell as un-responsive or not.

If a cell is identified as un-responsive, or suspected to be un-responsive, the algorithm may test the suspected un-responsive cell to determine its status. In some embodiments, one or more of the UEs active in the communication network may be selected to serve as test devices to contact the cell that is suspected to be in the un-responsive stage. For example, UE devices generally report their location and the identities of cells with which they are in contact, such as by receiving a random-access channel broadcast by a cell, or cells to which the UE devices are attached. Thus, the algorithm can identify UEs which are on neighboring cells in the vicinity of the suspected un-responsive cell. In turn, the algorithm can communicate with the UE devices, through one or more connected cells, to encourage or force the UE devices to contact the suspected un-responsive cell.

In an example, the UE devices selected as test devices can be encouraged or forced to perform a handover to the suspected un-responsive cell. In a handover, the UE device is initially communicating on a first frequency or band of frequencies with a source cell, selects or is assigned a second frequency or band of frequencies with a target cell, initiates communication with the target cell and terminates communication with the source cell. In another example, the test UE devices can be forced or encouraged to relocate into the suspected un-responsive cell. The algorithm may send a request to the neighboring cells to direct those neighboring cells to adjust handover priorities or frequencies or cell priorities for cell reselection or handover in order to encourage cell reselection or handover from the neighboring cell to the cell suspected of being un-responsive.

FIG. 2B depicts an illustrative embodiment of a message for communication in the communication network 200 of FIG. 2A in accordance with various aspects described herein. In the exemplary embodiment, FIG. 2B illustrates a System Information Block Type 5 message or SIB5 message 230. The SIB5 message 230 includes E-UTRAN frequency related information for inter-frequency cell re-selection and information relevant for cell reselection. The SIB5 message 230 includes frequencies with specific re-selection parameters as well as blacklisted cells. SIB5 is transmitted from the network to UE. The SIB5 message 230 may be broadcast by a cell periodically or broadcast by a cell on demand.

In the illustrated example, the SIB5 message 230 includes several parameters and parameter values for the parameters. A first parameter InterFreqCarrierFreqList parameter 232 contains multiple frequency bands designated dl_CarrierFreq parameter 234 of neighboring cells. Each dl_CarrierFreq parameter 234 is identified by the frequency band in megahertz. Each dl_CarrierFreq parameter 234 is mapped to a corresponding CellReselectionPriority parameter 236. Priority values are in the range [0 . . . 7], where 0 indicates lowest priority and 7 indicates highest priority. Each dl_CarrierFreq parameter 234 contains a list of neighboring cells operating in the corresponding frequency band. The SIB5 message 230 is generally unique for each cell including for each eNodeB. Other network devices, such as the RAN Intelligent Controller 218 may be used to update the SIB5 message 230 based on network configuration.

After forcing UE devices in the vicinity of the suspected un-responsive cell to attach to the cell or to attempt to hand over to the suspected cell, the algorithm collects data about traffic at the suspected cell and handovers to and from the suspected cell. Based on the collected data, the algorithm can confirm the status of the suspected cell. If the collected traffic data does not change, or if the handover data does not change, the lack of a change may indicate that the suspected cell is indeed un-responsive. The algorithm can exclude possibilities related to a lack of UE in the area of the suspected cell or other normal condition. Rather, the suspected un-responsive cell has a problem such that the UE selected as test devices cannot hand over to the suspected cell or reselect to the suspected cell.

Data collected from the UE devices operated as test devices may depend on the operational mode of the UE device. The UE device may generally be in idle mode or active mode. In idle mode, the UE is not engaged in a voice or data call but is awaiting initiation of such a call. In a first example, a call may be initiated at the UE, in response to action of the user of the UE or a process such as an application (app) installed on the UE. In another example, a call may be initiated by the network as the network signals a new voice or data call intended for the UE. In idle mode, as the UE moves through the region, the UE will select a new cell and attach to the new cell and will deselect the previous cell. The handover process in some embodiments may be under control of a mobile switching center (MSC) which may be, for example, implemented by or in conjunction with the RAN intelligent controller 218. Data about the handover operation may be reported to the MSC or other network devices for subsequent analysis and processing.

In active mode, the UE is actively engaged in a call. Data, including voice data, may be actively exchanged between the UE and a source cell. In active mode, with an active call underway, as the UE moves through the region, the call will be handed off from a source cell to a target cell. During a handoff period, the UE may be in contact with both the source cell and the target cell. After the handoff, the UE will drop the connection to the former source cell and the target cell becomes the source cell.

The algorithm collects data about traffic at the suspected cell and data bout handovers to and from the suspected cell. Different types of failure data may be collected and processed by the algorithm. A first time of failure is a handover failure. While the UE is in active mode, the UE will request handover to the target cell through the source cell. The handover request may be relayed directly from the source cell to the target cell or indirectly through a MSC on the network. If the target cell is un-responsive, the source cell will receive no response from the target cell during the handover process. The source cell will ultimately report a handover failure to the network, indicating reason of failure as no response from the target cell. The algorithm will collect this failure data.

A second type of failure data collected by the algorithm is a cell-reselection failure. While the UE is in the idle mode, the UE will send a random-access control channel (RACH) message to the target cell. If the target cell is in an un-responsive state, the UE will not receive a corresponding response from the target cell. The UE will notify this to the source cell. The source cell in turn will ultimately report a cell-reselection-failure, indicating reason of failure. The algorithm will collect this failure data.

A third type of failure data collected by the algorithm is a radio link failure. The UE will attempt to handover to the suspected un-responsive cell from a neighboring-cell, the source-cell. If the target cell is in an un-responsive state, the handover attempt will fail. Then the UE will attach back to the source cell. The UE will send a handover failure and/or a radio link failure (RLF) message to the source cell, including reason of failure, such as un-responsive target cell. The algorithm will collect this failure data.

The algorithm collects report failure messages and KPIs as described herein and confirms that the particular cell is the un-responsive stage. Once the un-responsive cell is confirmed, a trouble ticket may be automatically generated. The trouble ticket may include information identifying the particular cell, identifying the nature of the problem and recommending a proposed corrective action. The trouble ticket may be routed to service personnel, a network engineer or other suitable person for further action to investigate and correct the problem.

One or more of several possible rectification steps to revive the un-responsive cell may be taken. Such rectification steps include essentially stopping or interrupting operation of the cell or a portion of the cell. Such steps further include rebooting the hardware or software of the cell to reset cell operation or rebooting a portion of the cell, such as an eNodeB of the cell. Other possible rectification steps to revive the un-responsive cell include reloading software on the cell or an eNodeB of the cell. Each rectification has a relative cost associated therewith. Simply interrupting the cell by stopping operation and restarting the cell is relatively rapidly accomplished. Reloading software and bringing the cell back online in the network may require substantial time to accomplish. It is generally preferable to minimize the amount of time and intervention required to revive an un-responsive cell because of the disruption to network operations and customer service that occurs.

In some embodiments, the steps to revive the un-responsive cell may be automated. An automated process may review the failure messages and KPI information received from the network including the test UI devices. Based on the received information, the algorithm may decide on a particular rectification procedure, such as a hardware reboot of the un-responsive cell or a portion of the un-responsive cell, such as a single eNodeB of the cell.

Figure 2C:
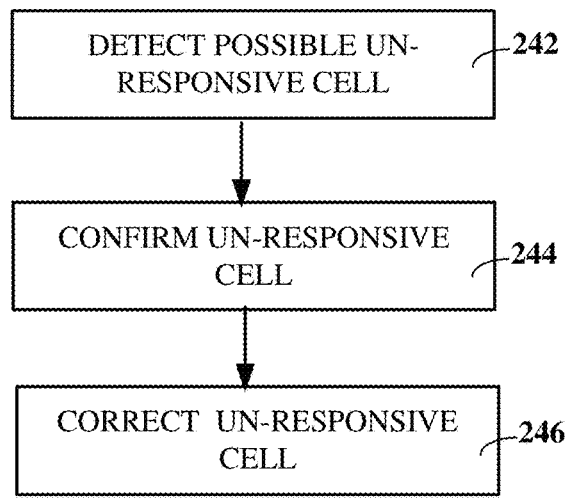
FIGS. 2C, 2D and 2E depict an illustrative embodiment of methods in accordance with various aspects described herein.

FIG. 2C depicts an illustrative embodiment of a method 240 in accordance with various aspects described herein. The method 240 may be used to automatically detect and correct an un-responsive cell in a radio telecommunication system. Un-responsive or non-responsive cells are defined as radio devices in a radio access network such as LTE or new radio (NR) that are not processing any data or control traffic although the cell is broadcasting system information block (SIB) messages and emitting signals. The un-responsive cell appears as a sleeping cell. Un-responsive cells are active cells, and other components of the network expect these cells to process data traffic, but they fail to do that.

The method 240 begins with step 242 in which a possible un-responsive cell is detected. Any suitable method for detecting an un-responsive cell may be used. Current and historical performance data may be collected and analyzed by a control algorithm to determine if a suspected cell is possibly un-responsive Further details of embodiments of step 242 are described in conjunction with FIG. 2D.

The method 240 continues with step 244 in which the method confirms that the suspected un-responsive cell is in fact un-responsive. In some embodiments, one or more user equipment (UE) devices may be designated as test UE devices to communicate with the possible un-responsive cell and collect performance information such as key performance indicators for the possible un-responsive cell. Further details of embodiments of step 242 are described in conjunction with FIG. 2D.

If it is confirmed that the suspected cell is un-responsive, at step 246, procedures are automatically undertaken to correct the unresponsive cell. In exemplary embodiments, the un-responsive cell may be restarted, rebooted or reinitiated on the network to correct the un-responsive condition.

Figure 2D:
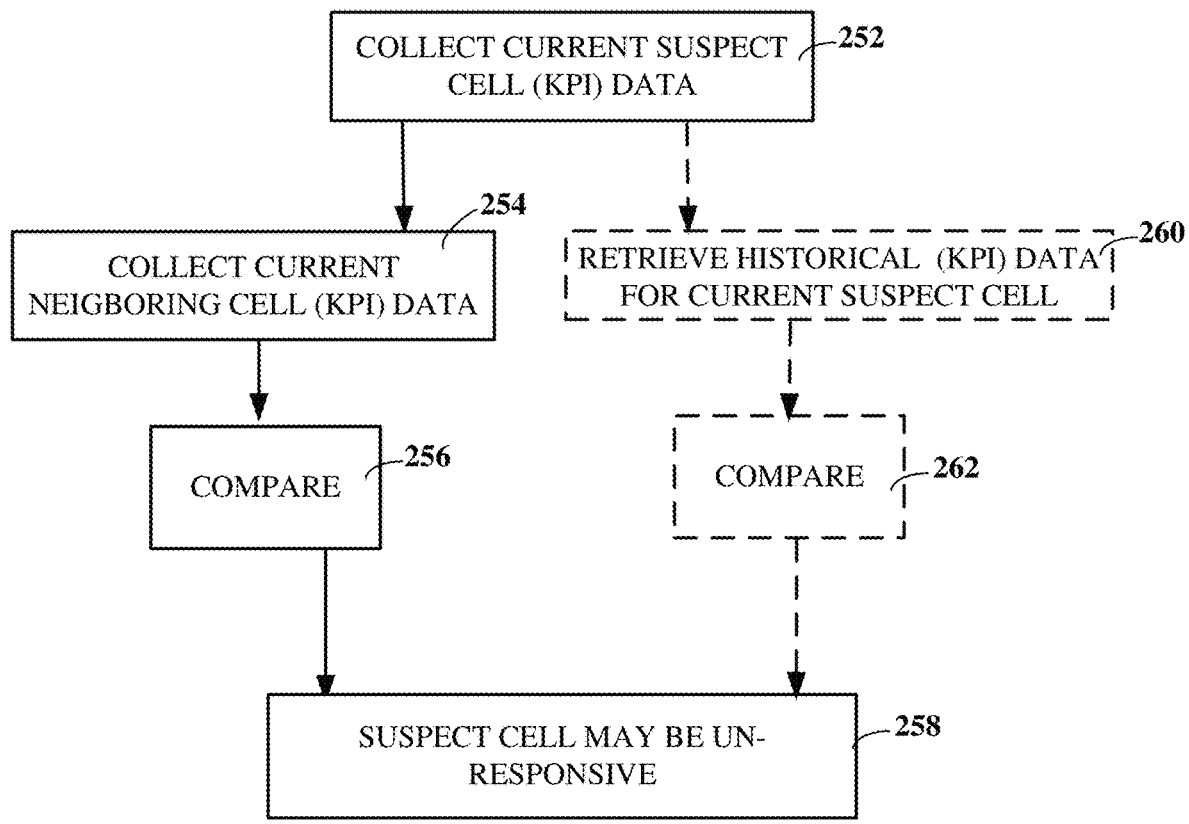

FIG. 2D depicts an illustrative embodiment of a method 250 in accordance with various aspects described herein. The method 250 may be used to automatically detect an un-responsive cell in a radio telecommunication system. Thus, step 242 of method 240 (FIG. 2C) may in some examples include steps of the method 250. The method 250 may be performed by any suitable equipment in a network. Suitable equipment includes a device with network access and sufficient data processing resources and memory to collect and process data about performance of one or more cells and user equipment devices in the network. In some embodiments, the method 250 may be performed by a processing system which is nominally dedicated to a mobile edge computing function. In other embodiments, the method 250 may be performed by a processing system which is nominally dedicated to a self-organizing network. In other embodiments, the method 250 may be performed by a processing system which is nominally dedicated to a device of the radio communication network such as a radio access network (RAN) intelligent controller. The method 250 may be embodied as instructions and code for causing a processor of a processing system to perform operations in accordance with embodiments described herein.

The method begins at step 252. The method includes collecting current performance data for a suspected un-responsive cell in the radio communication network. Step 252 may be performed for all cells in the network, such as on a periodic basis such as once an hour. Step 252 may be performed for a subset of cells in the radio communication network, or in response to any other input condition. Any suitable performance data may be collected. In some embodiments, the performance data relates to key performance indicators (KPIs) of the cell, group of cells, one or more UE devices or the radio communication network. KPI data, for example, may relate to cell selections and reselections by UE devices, handovers including attempted handovers and successful handovers among cells, and other operational data.

Generally, as a cell is operating, the cell collects and reports data about its operation. Such data may be standardized and include features such as timestamps, identification information for other network elements with which the cell interacts and information about success or failure of an operation. As one example, if a cell attempts to hand over an active call with a particular UE device and the handover fails, the cell may record and report the fact of the failed handover, the identification of the cell itself, the identification of the attempted handover cell and the identification of the UE device. All suitable information may be collected and reported. The reported data may be stored locally at the cell or communicated over the network to any other device including the device performing the method 250.

At step 254, method 250 includes collecting current performance data for one or more neighboring cells. The algorithm communicates over the network with the suspect cell and neighboring cells and collects handover reports and KPIs from source cells and UE devices that attempt handover to the cell suspected to be in an inactive stage The neighboring cells are cells which are similar to the suspected cell and may exhibit similar performance characteristics. Similar cells may be any suitable or similar cells in the network. For example, cells which are located in the same geographic area may be considered as similar cells because, by being physically near to the suspected cell, they nearby cells may experience similar volumes of traffic over the same time period. Further, cells which are immediately adjacent to a suspected cell may be considered as neighboring cells. Still further, cells that are further distant from the immediately adjacent cells may be considered as neighboring cells, as well. In some embodiments, performance data for more remotely located cells may be weighted relative to the performance data for the immediately adjacent cells.

Analysis of data from neighboring cells may assist in detecting that the suspected cell is un-responsive or sleeping. A change in KPI values or other performance data detected for the suspected cell may be due to a reason other than un-responsiveness by the suspected cell. There may be an overall reduction in traffic in the area served by the suspected cell and its neighboring cells. There may be another network problem affecting the suspected cell and its neighboring cells. By analyzing performance data from neighboring cells as well as the suspected cell, the algorithm can localize performance problems to the suspected cell. A sleeping cell can be detected and identified.

Any suitable performance data may be collected from the cells considered neighboring cells. For example, KPI data may include data about cell selections by UE devices attempting to connect with the cell and cell reselections by the UE devices. In another example, handover activities can be encouraged to force UE devices to hand over communication from a current cell to the particular suspected cell. Adjusting handover timing and priorities can be done in any suitable manner, such as by adjusting network setting for respective cells in the network or for respective UE devices in the network.

In another example, the algorithm requests neighboring cells to modify their local frequency or cell priority for cell-reselection and handover in order to encourage cell-reselection or handover from the neighboring cells into the suspect cell. This can be done through SIB5 message, as illustrated, for example, in FIG. 2B. The algorithm can mandate neighboring cells to broadcast these messages only to UE devices chosen as test devices. In exemplary embodiments, a relatively large number of these UE devices will attempt to cell-reselect or handover HO the particular suspected cell, generating statistically meaningful amounts of data.

In an example involving a handover failure, while UE device is in active-mode, the UE device will request handover to the suspected cell as a target-cell through source-cell with which the UE device is currently in an active call. If the target cell is in fact an un-responsive cell, the source cell will receive no response from the target-cell during the handover process. The source cell will ultimately report the handover failure to the network, indicating the reason of the failure. The reported failure will be collected and stored by the algorithm for further analysis. This process may be repeated for a relatively large number of UE devices, over a period of time. In an example, handover data is collected over one hour for dozens or hundreds of UE devices.

In an example involving a cell reselection failure, while the UE device is in idle mode, i.e., attached to a cell but not actively in a voice call or a data call. The UE device will send a random-access control channel (RACH) message to the suspected target cell. The RACH message seeks to attach the UE device to the target cell. If the suspected target cell is indeed an un-responsive cell, the UE device does not receive a corresponding response from this cell. The UE device will notify this failure to respond to the source cell, to which the UE device is currently attached. The source cell will ultimately report a Cell-Reselection-Failure, indicating the reason of failure, to the network. The reported failure will be collected and stored by the algorithm for further analysis. This process may be repeated for a relatively large number of UE devices, over a predetermined period of time. In an example, cell reselection data is collected over one hour for dozens or hundreds of UE devices.

At step 256, data collected at step 252 and step 254 are compared by the algorithm to determine if the suspected cell is an un-responsive cell. For example, KPI data for the suspected cell may be compared with KPI data for neighboring cells. If the KPI data for the suspected cell is similar to the KPI data for the neighboring cells, the suspected call may be considered to be operating nominally and not an un-responsive cell. In another example, if the performance data, KPI data or other data for the suspected cell is not similar to the same data for the neighboring cells, the suspected cell may be considered an un-responsive cell. Similarity of KPI data or any other performance data may be determined on any suitable basis. For example, several KPI values may be averaged and compared with a predetermined threshold value. In another example, each respective KPI value of a plurality of KPI values for the suspected cell may be compared with a threshold value. If a threshold number of respective KPI values exceeds a predetermined threshold number, the suspected cell may be considered to be an un-responsive cell. Any suitable statistical analysis may be performed on the collected current suspected cell data and the collected current neighboring cell data to determine the current status of the suspected cell.

In some embodiments, the method 250 may include step 260 and step 262 in addition to, or instead of, step 254 and step 256. Step 260 and step 262 are shown in dashed lines in FIG. 2D to indicate they may be performed optionally. In addition, in some embodiments, step 260 and step 262 may be performed in the method 250 and step 254 and step 256 may be optionally performed.

At step 260, the algorithm retrieves historical performance data for the suspected cell. Such performance data may include KPI data in some examples. The historical performance data may be retrieved from any suitable source, such as a network accessible database storing data about network performance. The historical performance data may cover any suitable time period. In embodiments, the historical performance data retrieved at step 260 may cover a time period analogous to the time period covered by the current suspected cell data collected at step 252. For example, if the current suspected cell data covers a current time period of two hours when the suspected cell appears to be an un-responsive cell, the historical performance data retrieved at step 260 may cover a similar, two-hour time period during a similar period when traffic in the network is similar, such as the same day of the week and the same time of data. This may ensure that a reliable comparison may be made between the historical performance data and the current suspected cell data.

A step 262, the historical performance data and the current suspected cell data are compared by the algorithm to determine if the suspected cell is an un-responsive cell. For example, current KPI data for a current time period for the suspected cell may be compared with historical KPI data for a similar time period for the suspected cell. Any suitable analysis may be done as part of the comparison to determine if the suspected cell is an un-responsive cell. For example, if the suspected cell has a relatively large number of handover failures or cell reselection failures during the current time period, such as the current day, compared to the same time period on the previous day or the same day during the previous week, the suspected cell may be considered an un-responsive cell. In an example, a difference for a type of KPI failure data may be determined between the current data and the historical data and the difference may be compared with a threshold value. If the threshold value is exceeded, indicating more failures of that type of KPI failure data, the algorithm may conclude the suspected cell is an un-responsive cell.

At step 258, based on the comparison of step 256 and the comparison of step 262, the algorithm may conclude that the suspected cell in an un-responsive cell. Once an un-responsive cell has been detected in the network, such as by method 250, additional steps may be taken to confirm the cell is an un-responsive cell and, if confirmed, to correct the un-responsive cell.

Figure 2E:
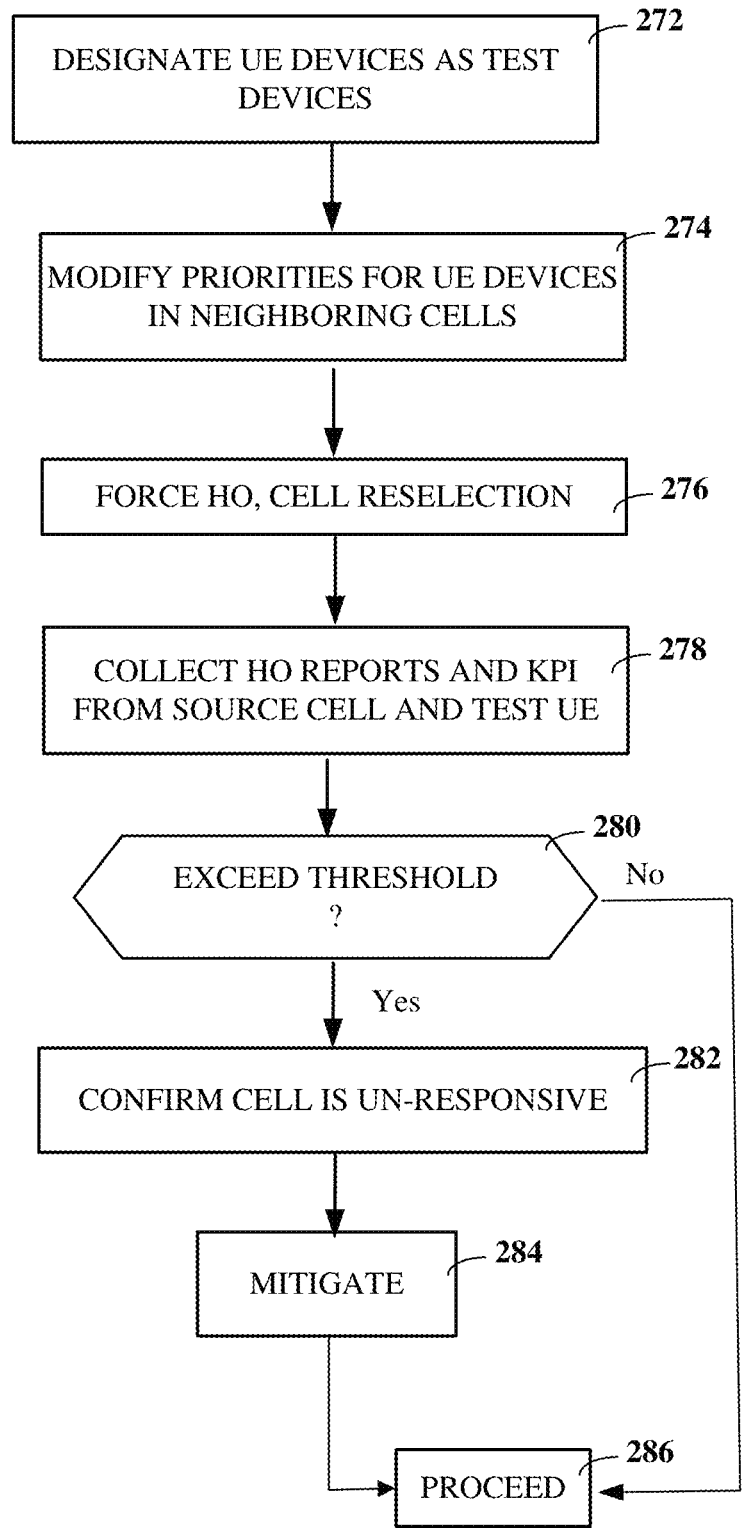

FIG. 2E depicts an illustrative embodiment of a method 270 in accordance with various aspects described herein. The method 270 may be used to automatically detect an un-responsive cell in a radio telecommunication system and correct the un-responsive cell by adjusting equipment of the unresponsive cell to return the un-responsive cell to normal operation. In normal operation, the cell receives communications from UE devices and responds to the UE devices with expected communications, according to the air interface standard for the radio access network and according to factors such as current traffic conditions. Normal operation may include a level of operation that includes functions determined by the service provider of the communication network 200 to satisfy operational requirements. Such normal operation may or may not be all of the functions being performed by the equipment of the cell prior to detecting the cell being un-responsive. Thus, step 242 and step 246 of method 240 (FIG. 2C) may in some examples include steps of the method 270.

At step 272, one or more user equipment (UE) devices may be designated as test devices for detecting or confirming that a cell in a radio communication network is an un-responsive cell. In an example, the algorithm may identify UE devices that have attached to neighboring cells in the vicinity of the suspected cell. The algorithm then requests neighboring cells to change parameters to force re-selection or handover of the UE devices. The UE devices will respond by trying to re-connect to or handover to the suspected cell. Any suitable number of UE devices may be selected as test devices. In some embodiments, only idle mode UE devices are selected as test devices so as not to disrupt any ongoing customer voice or data calls due to a failed handover. In other embodiments, both idle mode and active mode devices are selected as test devices.

At step 274, the algorithm requests neighboring cells to modify frequencies and/cell priority for cell-reselection and handover order to encourage cell-reselection and handover from neighboring cells into inactive cell. This can be done through SIB5 message, for example. FIG. 2B illustrates such a SIB message. The SIB message includes a parameter InterFreqCarrierFreqList which contains multiple frequency bands, designated by the parameter dl_CarrierFreq, of neighboring cells. Each parameter dl_CarrierFreq is identified by the frequency band in Mhz. Each dl_CarrierFreq, in turn, is mapped to a corresponding CellReselectionPriority. Priority values are in the range [0 . . . 7], where 0 indicates lowest priority and 7 indicates highest priority. Each dl_CarrierFreq parameter contain a list of neighboring cells operating in the corresponding frequency band. The SIB5 message is unique for each eNodeB of a cell. The SIB5 message may be communicated to the neighboring cells to adjust cell reselection priority values for the neighboring cells. Any suitable network device such as a RAN Intelligent Controller (RIC) may be used to update SIB5 of the neighboring cells based on network configuration. This will adjust hand-off priorities to influence the test UE devices to initiate a reselection to the suspected cell or to attempt a handover to the suspected cell.

In some embodiments, the algorithm can mandate the neighboring cells to broadcast control messages only to UE test devices chosen in step 272. It is expected that a relatively large number of these test UE devices, such as 10 to 100 devices, will attempt to cell-reselect/HO this particular suspect cell.

At step 276, the algorithm requests the neighboring cells to perform blind handover into the suspected un-responsive cell. Blind handover is also referred to as forced handover or without prior measurements of the quality or power level of the target frequency on suspected un-responsive cell. Generally, in a blind handover, a UE device will attempt to hand over to target cell, i.e., the suspected cell, without the UE device first sending a prior measuring report about channel quality of power level.

Step 276 may generally include a relatively large number of UE devices, such as 10 to 100 or more devices over a designated period of time, such as 15 minutes or an hour, attempting to reselect the suspected cell or hand over to the suspected cell. For each attempt, performance data is recorded about success or failure of the attempt. The performance data may be collected by any cell in the network, such as the source cell, the target or suspected cell, or by any UE device including the test UE device. The recorded performance data may be collected and stored as KPI data.

At step 278, the recorded performance data may be collected by the algorithm, such as at the self-organizing network control module 224, the mobile edge compute control module 226 or the RAN intelligent controller 218, for further processing and analysis. The algorithm collects handover reports and KPI data from source cells and UE devices that attempt hand over to the suspected un-responsive stage.

At step 280, the algorithm confirms from the collected data if the suspected cell is indeed inactive. In an embodiment, the algorithm compares KPI data and handover report data with threshold values to confirm a cell is un-responsive, step 282. Any suitable threshold values may be used, including respective threshold values for respective KPI data. The threshold comparisons for each respective KPI may be evaluated separately and separately to confirm the suspected cell is un-responsive. In other embodiments, the threshold comparisons for each respective KPI may be combined in any suitable manner and evaluated to confirm the suspected cell is un-responsive.

If the suspected cell is confirmed to be un-responsive, at step 284, procedures are taken by the algorithm to mitigate the un-responsive cell and return the cell to active functioning in the network. In an example, the algorithm may communicate with another network component to initiate a reset on the confirmed un-responsive cell. For example, in the embodiment of FIG. 2A, the mobile edge compute control module 226 implements the algorithm on a processing system of the mobile edge compute control module 226 and confirms that the suspected cell is a confirmed un-responsive cell. The mobile edge compute control module 226 communicates a signal to the RAN intelligent controller 218 to initiate a reset operation of the confirmed un-responsive cell. A reset operation is relatively unintrusive and may cause minimal impact on the network and traffic in the network.

In some embodiments, after the reset operation, some portion of method 270 may be repeated to determine of the confirmed un-responsive cell is successfully reset and is again operating normally. For example, a subset of UE devices may be designated as test devices and may be encouraged to reselect for the confirmed un-responsive cell or to attempt to hand over to the confirmed unresponsive cell. If the cell is responsive and operating normally, control proceeds to step 286 and network operation proceeds normally.

In some embodiments, mitigation measures may be escalated if the confirmed un-responsive cell is not reset. In a first level of mitigation, the confirmed unresponsive cell may be rebooted under control of the algorithm to again initiate normal operation. After the reboot operation, some portion of method 270 may be repeated to determine if the confirmed unresponsive cell is now functioning normally. If the cell is again confirmed as un-responsive, a process of reloading software on the confirmed unresponsive cell may be initiated to further escalate mitigation of the problem. Again, portions of method 270 may be repeated to determine if normal operation has returned.

If, through automatic intervention by the algorithm and components of the network, normal operation is not returned, the algorithm may generate an indication requesting human involvement. Human involvement may include dispatching a crew and service equipment to the site of the confirmed unresponsive cell to take further, manual mitigation measures.

If, at step 280, the handover report information, KPI data and other performance data do not confirm that the suspected un-responsive cell is in fact un-responsive, control proceeds to step 286. Network processing resumes as normal.

While for purposes of simplicity of explanation, the respective processes are shown and described as a series of blocks in FIGS. 2C, 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of the communication network 200, and method 240, method 250 and method 270 presented in FIGS. 1, 2A, 2B, 2C, 2D, 2E and 3. For example, virtualized communication network 300 can facilitate in whole or in part detecting and identifying a cell in a radio communication system that is in an un-responsive state, confirming the unresponsive state using user equipment devices as test devices, and correcting the un-unresponsive state.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
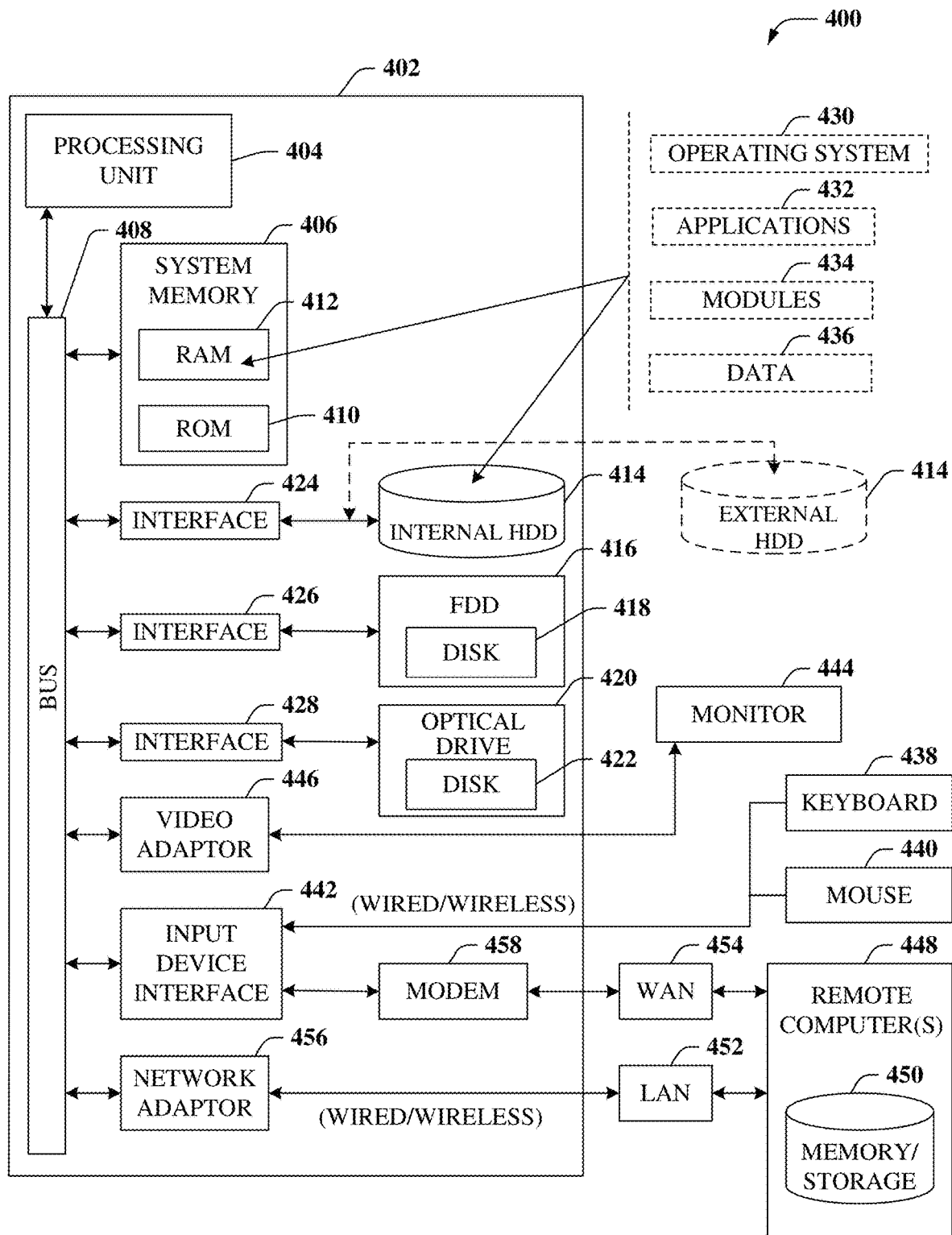
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part detecting and identifying a cell in a radio communication system that is in an un-responsive state, confirming the unresponsive state using user equipment devices as test devices, and correcting the un-unresponsive state.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
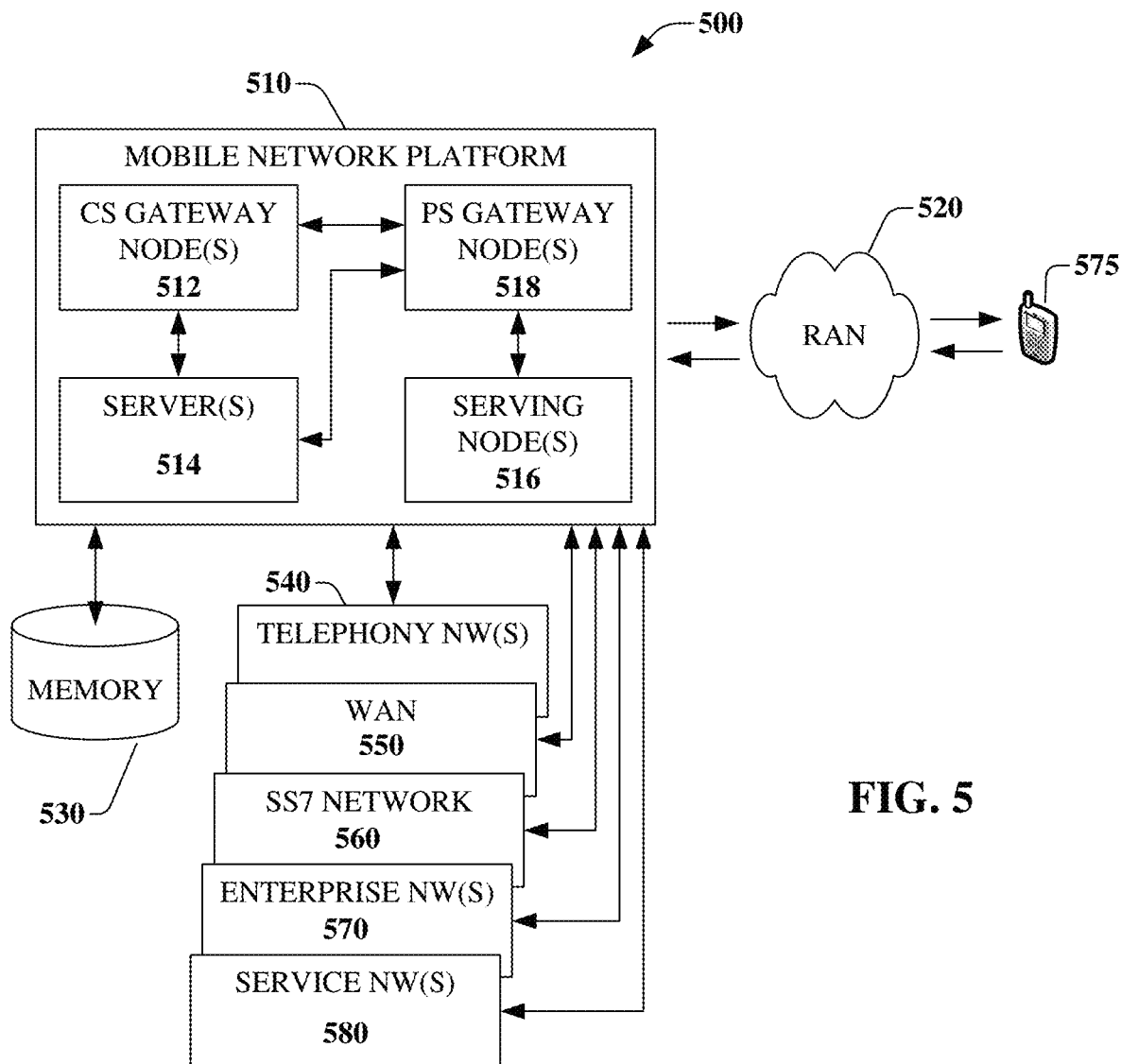
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part detecting and identifying a cell in a radio communication system that is in an un-responsive state, confirming the unresponsive state using user equipment devices as test devices, and correcting the un-unresponsive state. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS).

Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
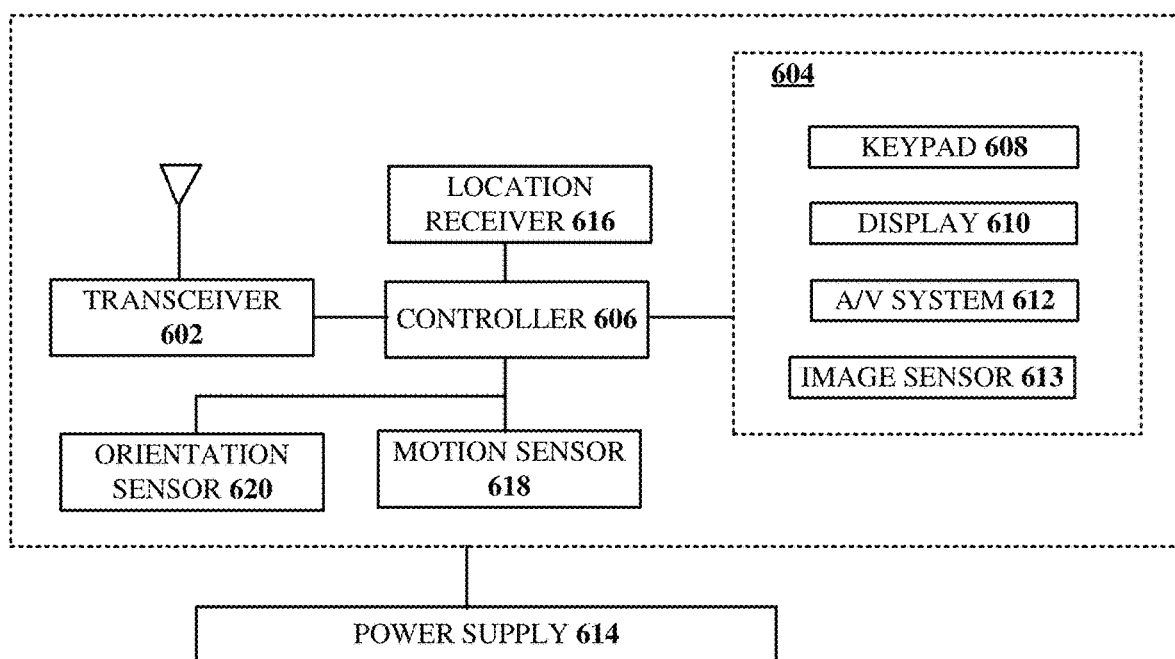
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate in whole or in part detecting and identifying a cell in a radio communication system that is in an un-responsive state, confirming the unresponsive state using user equipment devices as test devices, and correcting the un-unresponsive state.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   collecting, by a processing system including a processor, current performance data for a particular cell of a radio communication system;
   comparing, by the processing system, the current performance data with normal performance data for one or more cells of the radio communication system, forming a comparison;
   concluding, by the processing system, that the particular cell is a suspected un-responsive cell, wherein the concluding is based on the comparison;
   confirming, by the processing system, that the suspected un-responsive cell is un-responsive, wherein the confirming is based on testing responsiveness of the suspected un-responsive cell to test communications; and
   adjusting equipment at the suspected un-responsive cell.

2. The method of claim 1, comprising:
   transmitting, by the processing system, a reset signal to the particular cell, the particular cell responsive to the reset signal to initiate normal operation of the particular cell.

3. The method of claim 1, further comprising:
   receiving, by the processing system, test failure data from one or more user equipment (UE) devices attached to neighboring cells of the radio communication system; and
   confirming, by the processing system, that the suspected un-responsive cell is un-responsive based on the test failure data.

4. The method of claim 3, wherein the receiving test failure data comprises:
   receiving, by the processing system, handover failure data, cell-reselection failure data, or UE radio link failure data, or a combination of these.

5. The method of claim 1, further comprising:
   collecting, by the processing system, neighboring cell performance data for one or more neighboring cells of the radio communication system;
   comparing, by the processing system, the current performance data with the neighboring cell performance data, forming a neighboring cell comparison; and
   concluding, by the processing system, that the particular cell is a suspected un-responsive cell, wherein the concluding is based on the neighboring cell comparison.

6. The method of claim 5, further comprising:
   retrieving, by the processing system, historical performance data for the particular cell;
   comparing, by the processing system, the current performance data with the historical performance data, forming a historical comparison; and
   concluding, by the processing system, that the particular cell is a suspected un-responsive cell, wherein the concluding is based on the neighboring cell comparison and the historical comparison.

7. The method of claim 1, further comprising:
   retrieving, by the processing system, historical performance data for the particular cell;
   comparing, by the processing system, the current performance data with the historical performance data, forming a historical comparison; and
   concluding, by the processing system, that the particular cell is a suspected un-responsive cell, wherein the concluding is based on the historical comparison.

8. The method of claim 1, comprising:
   selecting, by the processing system, user equipment (UE) devices as test devices, the UE attached to neighboring cells of the radio communication system;
   forcing, by the processing system, a cell reselection attempt by the UE devices to the particular cell; and
   receiving, by the processing system, cell-reselection failure data responsive to the cell reselection attempt.

9. The method of claim 1, comprising:
   selecting, by the processing system, user equipment (UE) devices as test devices, the UE attached to neighboring cells of the radio communication system;
   forcing, by the processing system, a cell handover attempt by the UE devices to the particular cell; and
   receiving, by the processing system, handover failure data responsive to the cell handover attempt.

10. A radio communication control device, comprising:
    a processing system including a processor; and
    a memory that stores executable instructions that, when executed by the processing system, facilitate performance of operations, the operations comprising:
      detecting a particular cell of radio communication system as being un-responsive, wherein the detecting is based on a received signature from the particular cell;
      confirming the particular cell as being un-responsive based on network data produced responsive to stimulus signals provided to the network; and
      responsive to a confirmation that the particular cell is un-responsive, communicating a signal from the radio communication control device to the particular cell, the particular cell responsive to the signal to restart the particular cell.

11. The radio communication control device of claim 10, wherein the confirming includes;
   encouraging user equipment (UE) devices attached to neighboring cells of the particular cell to initiate cell reselection to the particular cell, handover to the particular cell, or both;
   receiving performance data related to success of the cell reselection to the particular cell or handover to the particular cell; and
   confirming the particular cell as being un-responsive based on the performance data.

12. The radio communication control device of claim 11, wherein encouraging the UE devices to initiate cell reselection comprises:
   modifying cell priority for reselection of the neighboring cells.

13. The radio communication control device of claim 12, wherein the modifying cell priority for reselection comprises:
   selecting a predetermined group of UE devices as UE test devices; and
   communicating a system information block message to the UE test devices, the system information block causing the UE test devices to modify cell priority for reselection by the UE test devices.

14. The radio communication control device of claim 10, wherein the detecting a particular cell of radio communication system as being un-responsive comprises:
   collecting key performance indicator data for the particular cell for a current time period;
   comparing the key performance indicator data for the particular cell with nominal performance data for a cell of the radio communication system; and
   identifying the particular cell as being un-responsive based on the comparing.

15. The radio communication control device of claim 14, wherein the operations further comprise:
   collecting current neighbor cell performance data from neighboring cells of the particular cell in the radio communication system; and
   comparing the current neighbor cell performance data with the key performance indicator data for the particular cell.

16. The radio communication control device of claim 15, wherein the operations further comprise:
   retrieving historical performance data for the particular cell; and
   comparing the historical performance data for the particular cell with the key performance indicator data for the particular cell.

17. The radio communication control device of claim 10, wherein the radio communication device comprises one of a self-organizing network control module, a mobile edge compute control module, and a radio access network intelligent controller.

18. A non-transitory machine-readable medium, comprising executable instructions that, when executed by a processing system including a processor, facilitate performance of operations, the operations comprising:
   collecting network data for a plurality of cells of a cellular communication network;
   identifying a particular cell of the plurality of cells is in an un-responsive state, wherein the identifying is based on the network data;
   selecting a plurality of user equipment (UE) devices as UE test devices;
   forcing cell reselection attempts, handover attempts, or both, by the UE test devices to communicate with the particular cell;
   based on failure of the cell reselection attempts or failure of the handover attempts, confirming the particular cell is in the un-responsive state; and
   communicating a restart signal from the processing system to cause the particular cell to restart to a responsive state.

19. The non-transitory machine-readable medium of claim 18, wherein the operations further comprise:
   collecting current performance data for neighboring cells of the particular cell;
   collecting key performance indicator data for the particular cell;
   comparing the key performance indicator data for the particular cell with the current performance data for the neighboring cells; and
   identifying the particular cell is in the un-responsive state based on the comparing.

20. The non-transitory machine-readable medium of claim 19, wherein the operations further comprise:
   collecting historical performance data for the particular cell;
   comparing the key performance indicator data for the particular cell with the current performance data for the particular cell; and identifying the particular cell is in the un-responsive state based on the comparing.

* * * * *